United States Patent [19]

Bosco

[11] 4,078,698

[45] Mar. 14, 1978

[54] DEVICE FOR FEEDING, WITH THE REQUIRED ORIENTATION, SUBSTANTIALLY PARALLELEPIPED FLAT BODIES COMPRISING ASPECTS OF ASYMMETRY, IN PARTICULAR CASSETTES FOR MAGNETIC TAPES

[75] Inventor: Angelo Bosco, San Donato Milanese (Milan), Italy

[73] Assignee: AEG-Telefunken Societa Italiana per Azioni, Milan, Italy

[21] Appl. No.: 769,347

[22] Filed: Feb. 16, 1977

[30] Foreign Application Priority Data

Feb. 27, 1976 Italy .................................... 20706/76

[51] Int. Cl.² ............................................. B65H 9/20
[52] U.S. Cl. ................................................ 221/171
[58] Field of Search ................. 221/21, 171, 172, 173; 274/11

[56] References Cited

U.S. PATENT DOCUMENTS 2,935,226   5/1960   Hanson .............................. 221/171

Primary Examiner—Stanley H. Tollberg
Attorney, Agent, or Firm—Cushman, Darby & Cushman

[57] ABSTRACT

This invention relates to a device for feeding, with the required orientation, substantially parallelepiped flat bodies comprising aspects of asymmetry, in particular cassettes for magnetic tapes. The device according to the invention comprises a vertically extending tubular loader of substantially rectangular cross-section for a plurality of stacked flat bodies, an expulsion member for transversely push out the lowest stacked body, a chute for collecting and conveying said lowest body towards an outlet seat provided with orientation sensing structure, and a tilting member located at the inlet end of said chute and driven by said sensing structure to cause tilting of the pushed out body on one side or the other according to the detected orientation of the same body.

5 Claims, 5 Drawing Figures

DEVICE FOR FEEDING, WITH THE REQUIRED ORIENTATION, SUBSTANTIALLY PARALLELEPIPED FLAT BODIES COMPRISING ASPECTS OF ASYMMETRY, IN PARTICULAR CASSETTES FOR MAGNETIC TAPES

This invention relates to a device for feeding, with the required orientation, substantially parallelepiped flat bodies comprising aspects of asymmetry, in particular cassettes for magnetic tapes.

The normal cassettes for magnetic tapes notably consist of substantially parallelepiped flat boxes comprising on one side an element of asymmetry represented by a portion of increased height, through which the magnetic tape contained in the cassette is accessible from the outside for recording and reproducing purposes.

Moreover, whereas said cassettes have to be fed for filling and packaging to machines of various types (magnetic tape winders, labelling machines, wrapping machines, packaging machines, testers etc.) in a precisely orientated state, they are usually orientated before said operations at random, or, as occurs before feeding to the magnetic tape winding machine, stacked in alternate positions.

It is apparent that manually arranging cassettes with correct and constant orientation before feeding to the machine leads to loss of time, and therefore of productivity, which should desirably be avoided.

In view of this, the main object of the present invention is to provide an automatic device which enables magnetic tape cassettes presented at random with one or the opposite orientation to be reliably fed with the required orientation.

A further object of the present invention is to provide a feed device which may be used not only for magnetic tape cassettes but generally for any type of substantially parallelepiped flat body with aspects of asymmetry which define different conditions of orientation.

According to the invention said objects are attained by a device comprising a tubular loader of substantially rectangular cross-section extending vertically in such a manner as to be able to receive a plurality of stacked and diversely orientated flat bodies to be fed, an expulsion member operable transversely to the loader to push out the lowest of the stacked bodies therefrom, a chute for collecting and conveying said flat body towards an outlet seat, sensor means for detecting the orientation of said flat body at the moment of its expulsion from the loader, and a tilting member inserted in the inlet end of said chute and driven by said sensor means, according to the detected orientation, towards one or other of its two working positions on opposite sides of the chute, in which it can receive the impact of the flat body introduced and allowed to fall into the chute, and consequently cause said flat body to tilt into a substantially vertical position on one side or the other according to the detected orientation, so as to make the orientation of said flat body constant at the chute outlet.

It is apparent that the use of an automatic device such as that according to the present invention enables flat bodies to be loaded with random orientation, and yet be obtained orientated at the outlet in a uniform manner ready for feeding to the machine for which they are intended. Thus a considerable saving of time and labour is obtained, with a corresponding increase in productivity. This is particularly true in the case represented by the present example of application of the device according to the invention, in which the flat bodies to be fed with the desired orientation consist of magnetic tape cassettes to be fed to winding, labelling and testing machines etc.

One practical embodiment of the device according to the invention, for feeding magnetic tape cassettes, is described hereinafter in detail by way of non-limiting example, with reference to the accompanying drawings in which.

The automatic feeding device for magnetic tape cassettes shown in FIGS. 1 to 4 basically comprises a loader 1, an expulsion pawl 2, an orientation detector 3 and a chute 4.

Figure 1:
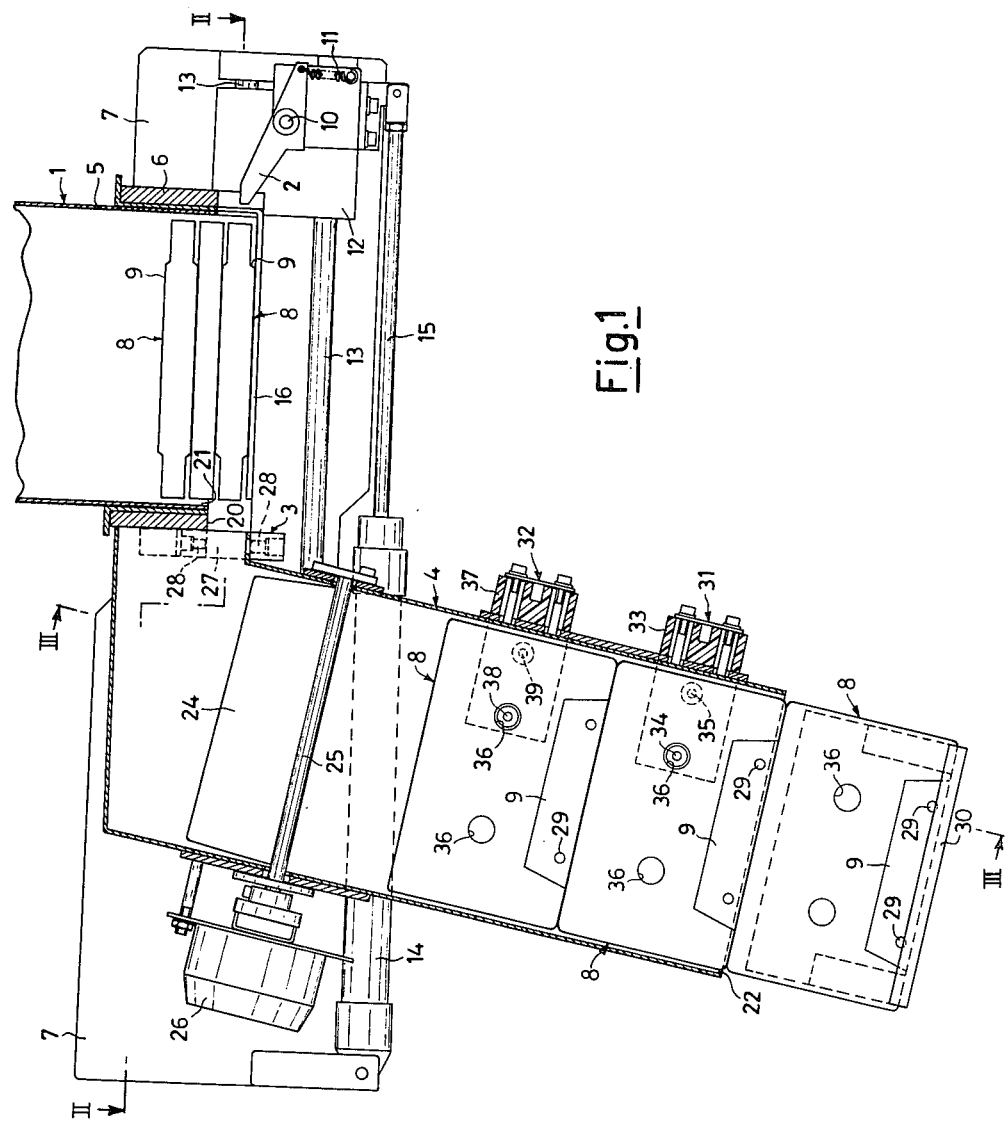
FIG. 1 is a vertical axial section on the line I—I of FIG. 2 through a device according to the invention for feeding magnetic tape cassettes with the required orientation.
Figure 2:
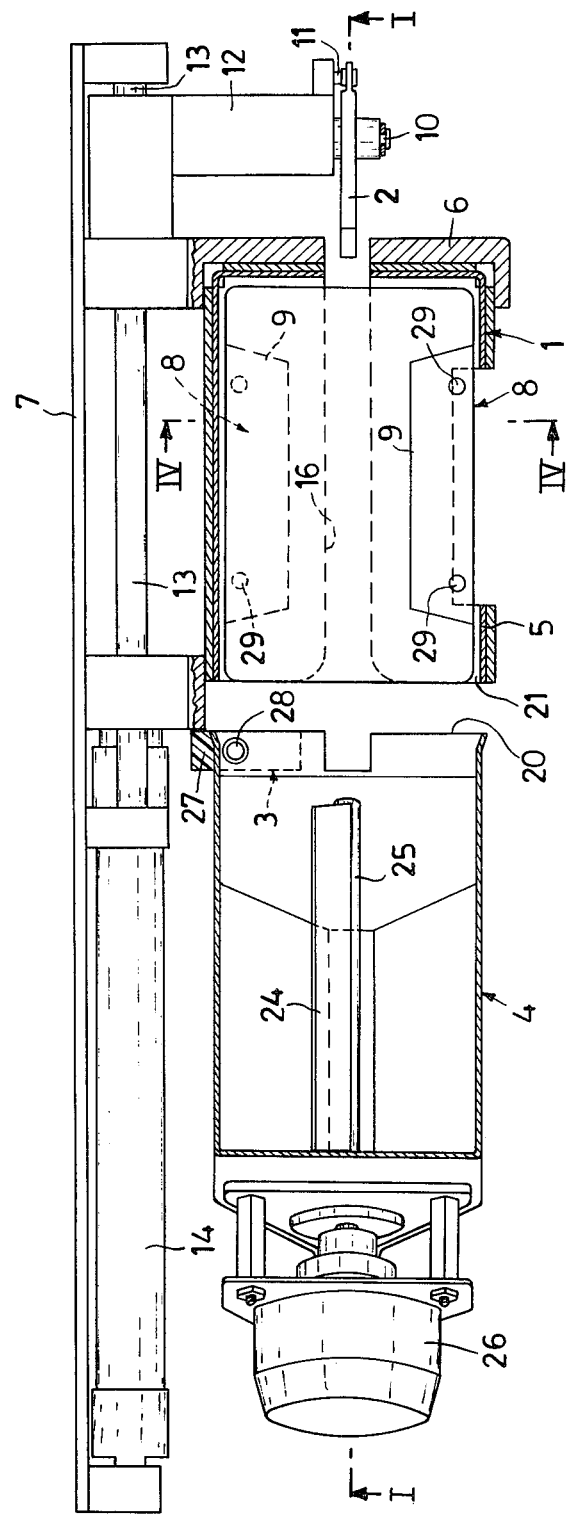
FIG. 2 is a horizontal section through the same device on the line II—II of FIG. 1.

The loader 1 (FIG. 1) consists of a tubular member of substantially rectangular cross-section 5 removably supported in a vertical position by a support structure 6 connected to a plate 7 (FIG. 2). The loader 1 is thus able, possibly by loading in a place separate from the rest of the device (so that, if required, one loader may be filled while another similar loader is in position in the device, with consequent increase in productivity), to receive a series of magnetic tape cassettes 8 (FIG. 5) stacked one on the other with the enlarged part 9 orientated at random towards the right or towards the left (relative to FIG. 4).

The loader 1 is open laterally at its bottom end (FIG. 1) to allow the lowest cassette in the stack to be expelled from the loader and fed into the chute 4. The cassette is expelled from the loader 1 by the expulsion pawl 2 which is pivoted at 10 (with a return spring 11) on a support block 12 which may be made to slide along guide rods 13 by a pneumatic cylinder 14 provided with a piston rod 15. As is easily seen from FIGS. 1 and 2, when the cylinder 14 moves the support block 12 through a working stroke from right to left (with reference to FIGS. 1 and 2) the pawl 2 enters and passes along a slot 16 provided in the bottom wall of the loader 1, and by engaging with the lowest cassette in the stack pushes it out of the loader and into the chute 4.

Figure 3:
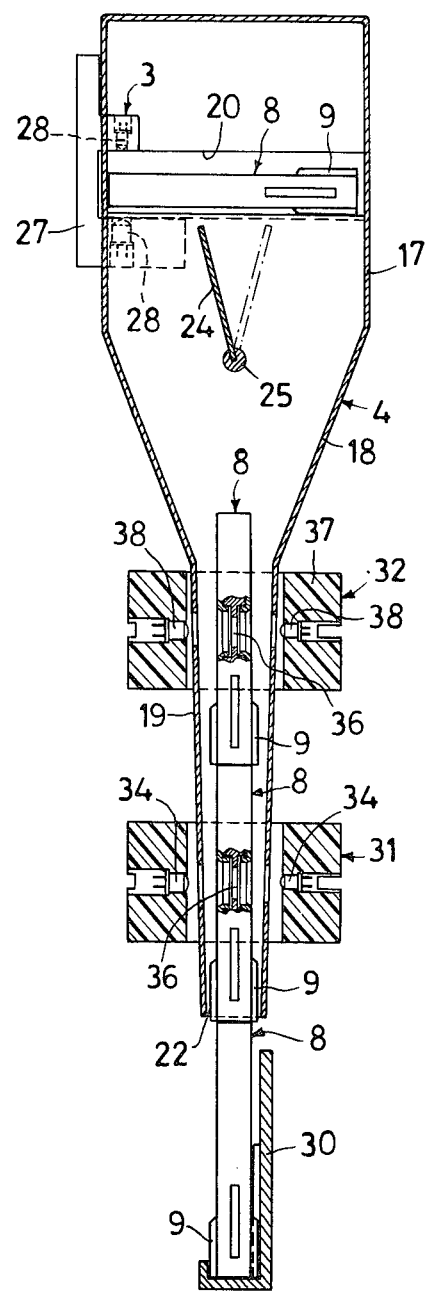
FIG. 3 is a longitudinal section through the chute of said device on the line III—III of FIG. 1.

As is clearly shown in FIG. 3, the chute 4 is formed from an upper inlet part of enlarged rectangular cross-section 17, a middle part 18 which contracts in the form of a funnel downwards and a lower outlet part of small rectangular cross-section 19. The upper part 17 is provided with a lateral inlet aperture 20 facing the lateral outlet aperture 21 of the loader 1 (FIGS. 1 and 2), while the lower part 19 is provided with a front outlet aperture 22. A tilting member 23 is disposed in the passage region between the upper enlarged part 17 and middle part 18, and is constituted by a fin 24 fixed rigidly to a rotatable pivot 25. By means of an electromagnet 26 (FIG. 1), the pivot 25 may be rotated from one to another of two extreme positions in which the fin 24 is disposed in the positions illustrated by a continuous line and by a dashed line in FIG. 3 respectively, i.e. in positions inclined laterally towards the left and towards the right (with respect to FIG. 3) relative to the chute axis.

Figure 4:
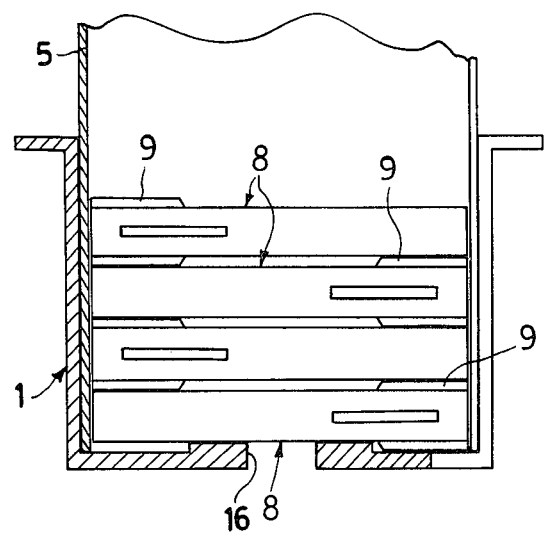
FIG. 4 is a longitudinal section through the loader of said device on the line IV—IV of FIG. 2.
Figure 5:
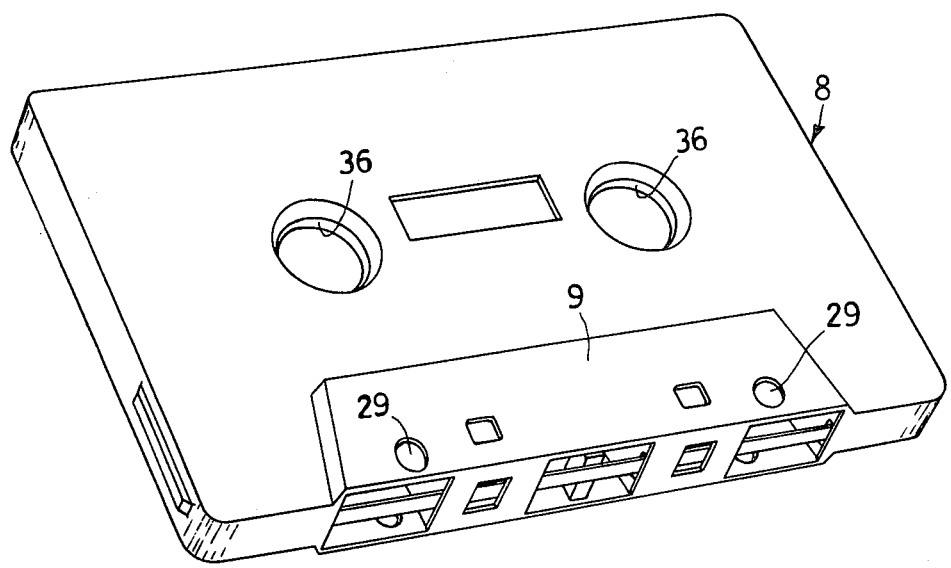
FIG. 5 is a perspective view of a magnetic tape cassette.

The orientation detector 3 energises or fails to energise the electromagnet 26 and hence chooses the position for the fin 24, the orientation detector being disposed at the inlet of the upper part of the chute 4 (FIGS. 1 and 2) and comprising a support 27 which supports a pair of cooperating photoelectric sensors 28 in vertically opposed positions, arranged to detect the passage or otherwise (indicative of the orientation of the cassette) of two pairs of opposing holes 29 provided in the enlarged part 9 of each cassette 8 (FIG. 5). If, when a cassette 8 is moved from the loader to the chute, the two sensors 28 sense the passage of said holes 29 (signifying that the cassette is orientated in a manner similar to the second from the bottom in the stack shown in FIGS. 1 and 4), the orientation detector 3 energises the electromagnet 26 which moves the fin 24 into the position shown by the dashed line in FIG. 3. Otherwise, i.e. if the two sensors 28 fail to sense passage of the holes 29 (signifying that the cassette is orientated in the same manner as the lowest one in FIGS. 1 and 4), the electromagnet 26 does not become energised and the fin 24 remains (or returns) to the position indicated by the continuous line in FIG. 3.

In relation to the described structure, the principle of operation of the device shown in FIGS. 1 to 4 is as follows.

Assuming that the loader 1 has already been filled with cassettes stacked with alternate orientation as in FIGS. 1 and 4, and that it is intended to feed the cassettes one at a time and with constant desired orientation to a suitable reception seat 30 disposed at the outlet of the chute 4 (FIGS. 1 and 3), the movable pawl 2 is operated by means of the cylinder 14 and advances along the slot 16 from right to left relative to FIGS. 1 and 2, to push the last (lowest) cassette of the pile out of the loader 1 and into the chute 4 (passing through the opposing apertures 21 and 22). If, as in the case shown on the drawings, the cassette expelled from the loader has its enlarged portion 9 disposed on the far side of the orientation detector 3, the two sensors 28 fail to sense the passage of the cassette holes 29, and by means of the electromagnet 26 move the fin 24 into the position shown by the continuous line in FIG. 3, i.e. with its upper edge moved towards the left (relative to FIG. 3). The expelled cassette, which is initially disposed in the manner shown in FIG. 3 above the fin 24, falls into the chute 4 and encounters the fin 24 in a position displaced towards the left (relative to FIG. 3), which causes it to rotate in a clockwise direction (relative to FIG. 3), so that it takes an approximately vertical position with the enlarged portion 9 facing downwards. Orientated in this manner, the cassette 8 is conveyed by the middle tapering part 18 of the chute towards the lower part (also slightly tapered) 19 and from here into the reception seat 30. If however the expelled cassette is orientated in the opposite manner, i.e. as in the case of the second from the bottom in FIGS. 1 and 4 with the enlarged part 9 disposed on the same side as the sensors 28, these latter sense the passage of the holes 29 and by means of the electromagnet 26 move the fin 24 into the position shown by the dashed line in FIG. 3. In this case the cassette enters the chute 4 with opposite orientation to that shown in FIG. 3, but as the fin 24 is displaced towards the right (relative to FIG. 3) the subsequent impact between the falling cassette and the fin 24 causes anti-clockwise rotation (relative to FIG. 3) of the cassette, the result of which is again that the cassette tilts into the required approximately vertical position with the enlarged portion 9 facing downwards. The combined action of the sensors 28 and positionable fin 24 therefore always gives the cassette fed to the seat 30 the same orientation, whatever its initial orientation in the loader 1.

Should it be required, as is sometimes preferred, to accumulate tilted cassettes in the lower part of the chute, further detecting devices 31 and 32 may be associated with the lower part 19 of the chute 4 at different heights. As shown in FIGS. 1 and 3, the detection device 31 comprises a C support 33 and two pairs of opposing sensors 34 and 35, the first of which coincides with the position in which one of the two drive socket holes 36 of the cassette is to lie when a cassette accumulates in the lower part of the chute above that already fed to the seat 30. Likewise, the detection device 32 comprises a C support 37 and two pairs of opposing sensors 38 and 39, the first of which coincides with the position in which the same drive socket hole 36 of a second fed cassette is to lie when accumulated above the first.

The addition of the detection devices 31 and 32 requires no modification to the system used for obtaining the required orientation of the cassettes. The only change is a modification to the manner of controlling the cylinder 14 for expelling the pawl 2, in the sense that this latter is operated only when the pair of sensors 35 of the device 31 or pair of sensors 39 of the device 32 (according to whether it is required to accumulate one or two cassettes above that already fed into the seat 30) senses the absence of a cassette. The purpose of the pairs of sensors 34 and 38 is to sense if the accumulated cassettes are in the correct position.

What we claim is:

1. A device for feeding, with the required orientation, substantially parallelepiped flat bodies comprising aspects of asymmetry, in particular cassettes for magnetic tapes, comprising a tubular loader of substantially rectangular cross-section extending vertically in such a manner as to be able to receive a plurality of stacked and diversely orientated flat bodies to be fed, an expulsion member operable transversely to the loader to push out the lowest of the stacked bodies therefrom, a chute for collecting and conveying said flat body towards an outlet seat, sensor means for detecting the orientation of said flat body at the moment of its expulsion from the loader, and a tilting member inserted in the inlet end of said chute and driven by said sensor means, according to the detected orientation, towards one or other of its two working positions on opposite sides of the chute, in which it can receive the impact of the flat body introduced and allowed to fall into the chute, and consequently cause said flat body to tilt into a substantially vertical position on one side or the other according to the detected orientation, so as to make the orientation of said flat body constant at the chute outlet.

2. A device as claimed in claim 1, wherein said loader is removably attached to a support structure so that it can be extracted and filled separately.

3. A device as claimed in claim 1, wherein said chute is formed from an upper inlet part of substantially enlarged rectangular cross-section, a middle part tapering downwards and a lower outlet part of substantially rectangular restricted cross-section, said upper part being provided with a lateral inlet aperture facing a lateral outlet aperture of the loader and housing said tilting member, and said lower part being open at its lower end.

4. A device as claimed in claim 3, wherein said tilting member is constituted by a fin rigid with an underlying rotatable pivot so that it can be controlled to assume one or other of two positions inclined towards opposite sides of the chute, said rotatable pivot being rotated by an electromagnet under the control of said sensor means for detecting the orientation.

5. A device as claimed in claim 1 for feeding magnetic tape cassettes with the required orientation, wherein said sensor means for detecting the orientation comprise a pair of opposing photoelectric sensors arranged to detect the passage or lack of passage, indicative of the cassette orientation, of at least one pair of aligned holes in the enlarged portion of the cassette when a cassette is moved from the loader and into the chute.

* * * * *